No. 789,799. PATENTED MAY 16, 1905.
W. H. DINSPEL & J. J. STOETZEL.
PNEUMATIC DESPATCH TUBE SYSTEM.
APPLICATION FILED AUG. 15, 1902. RENEWED APR. 1, 1904.
5 SHEETS—SHEET 1.
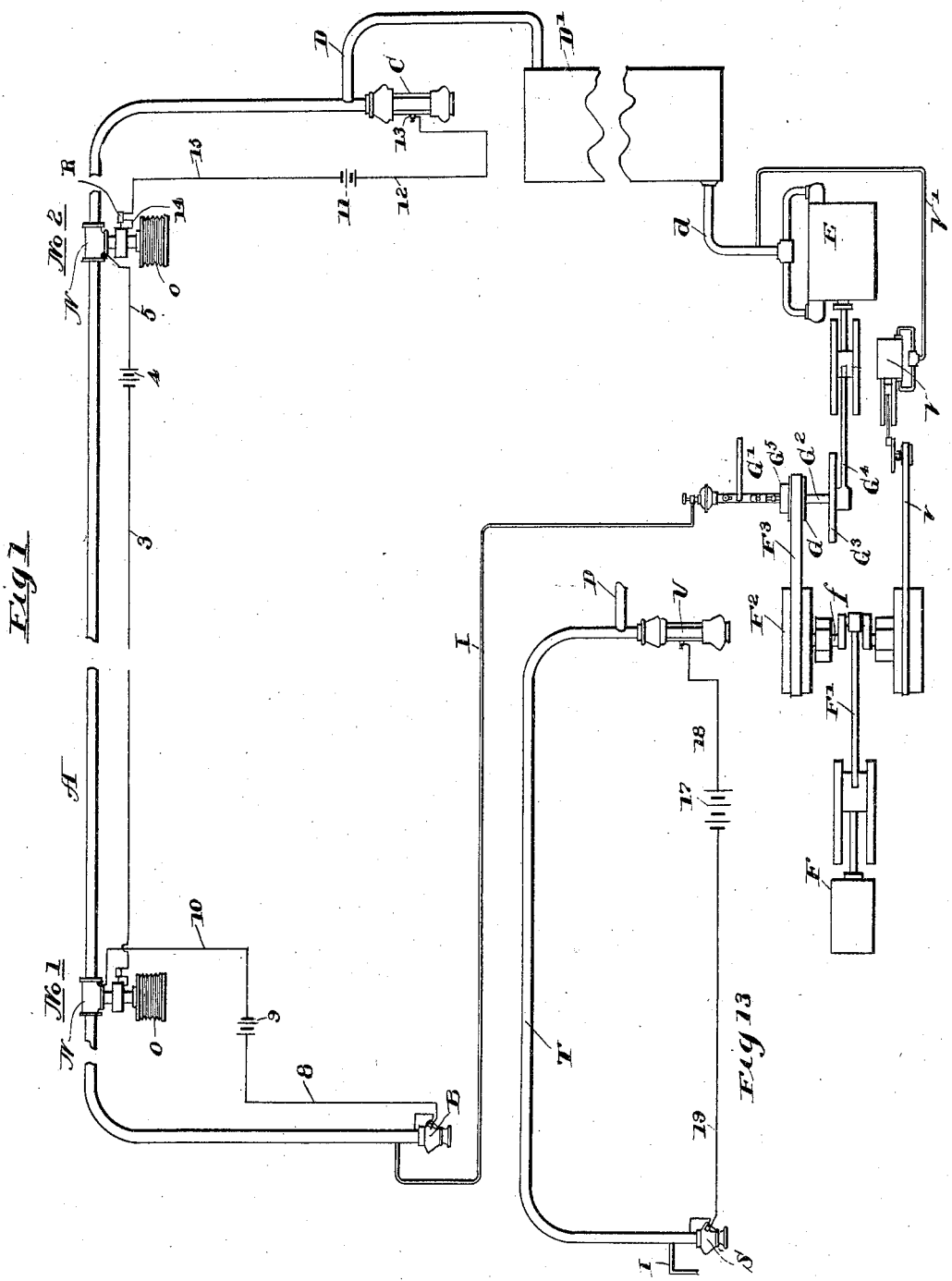

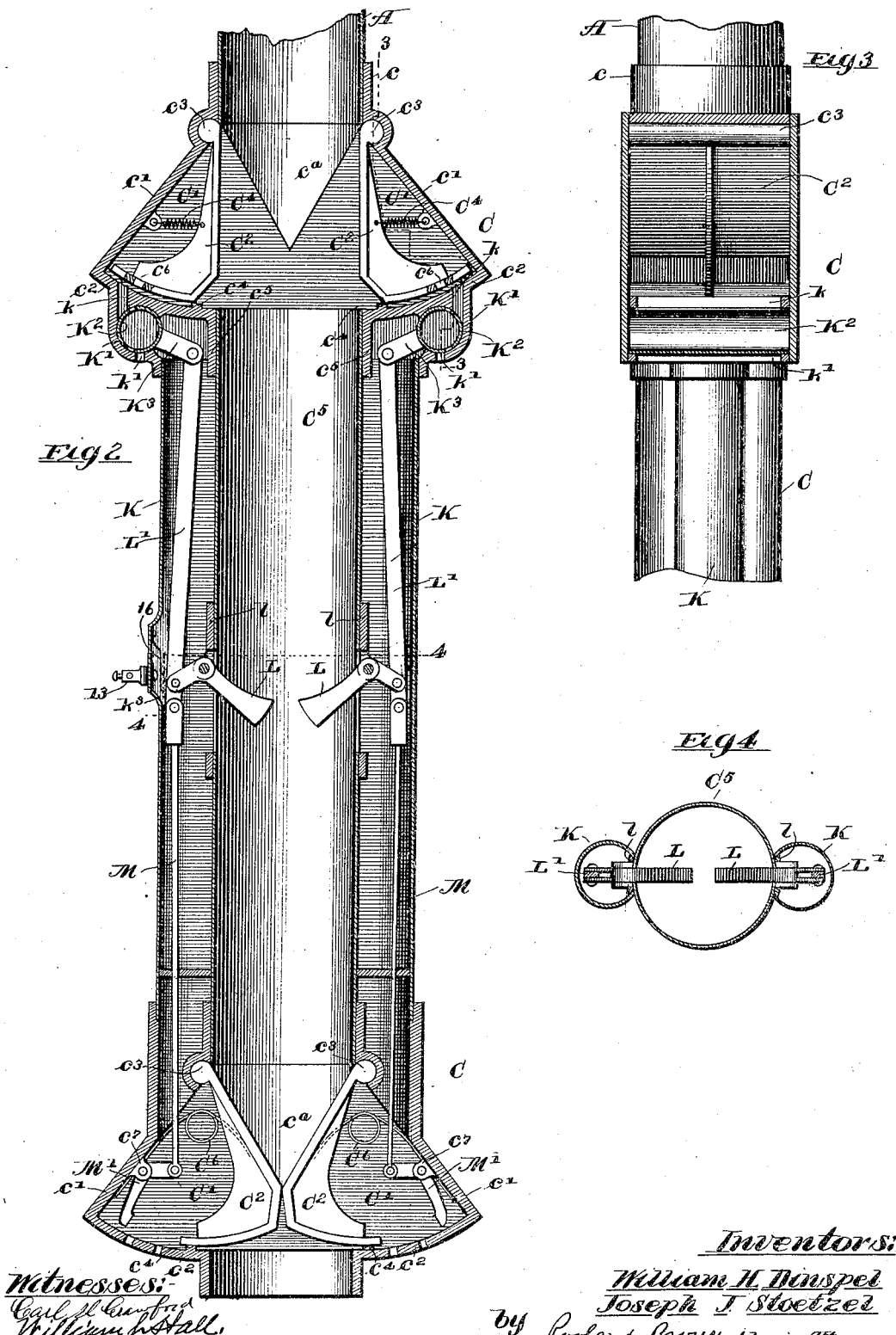

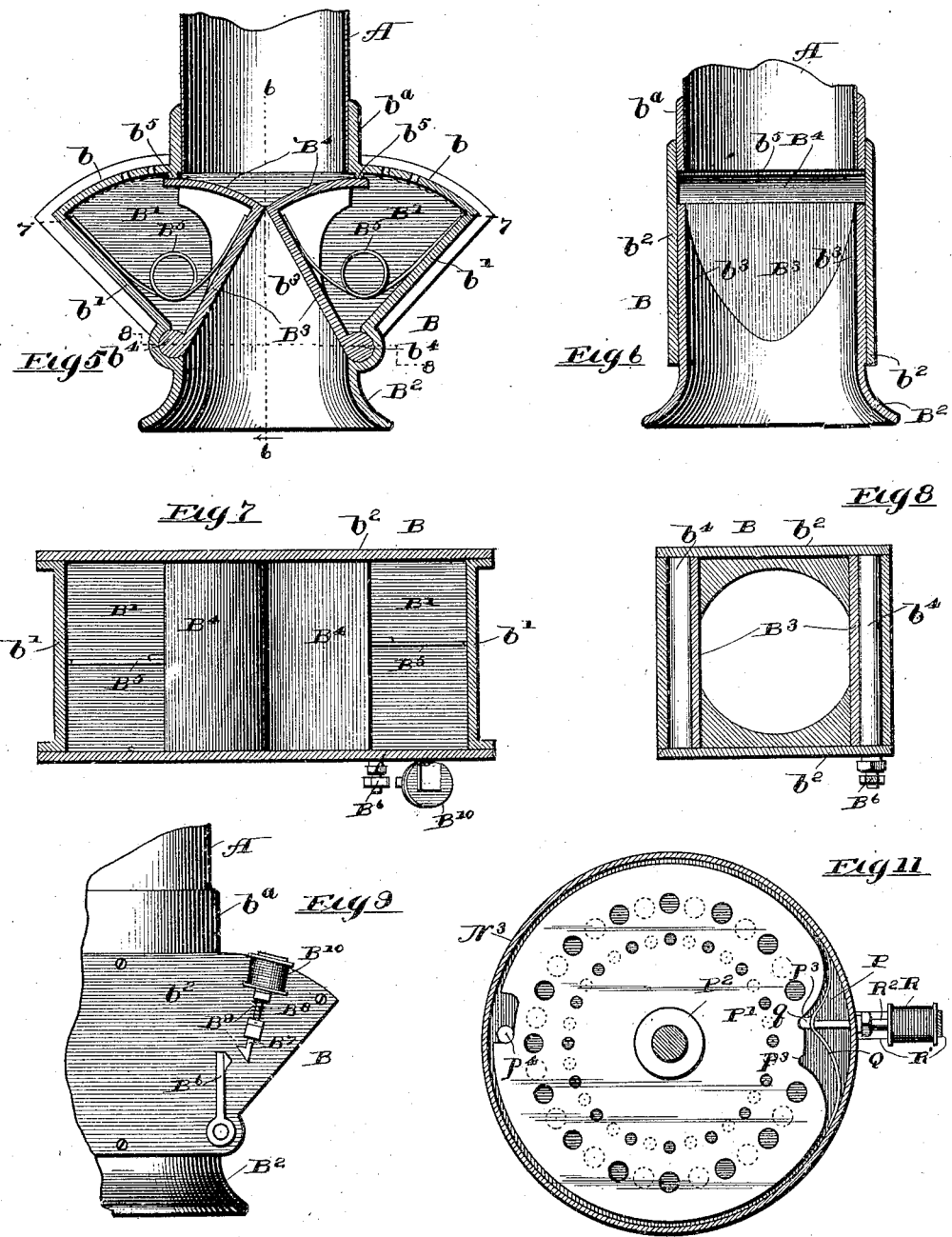

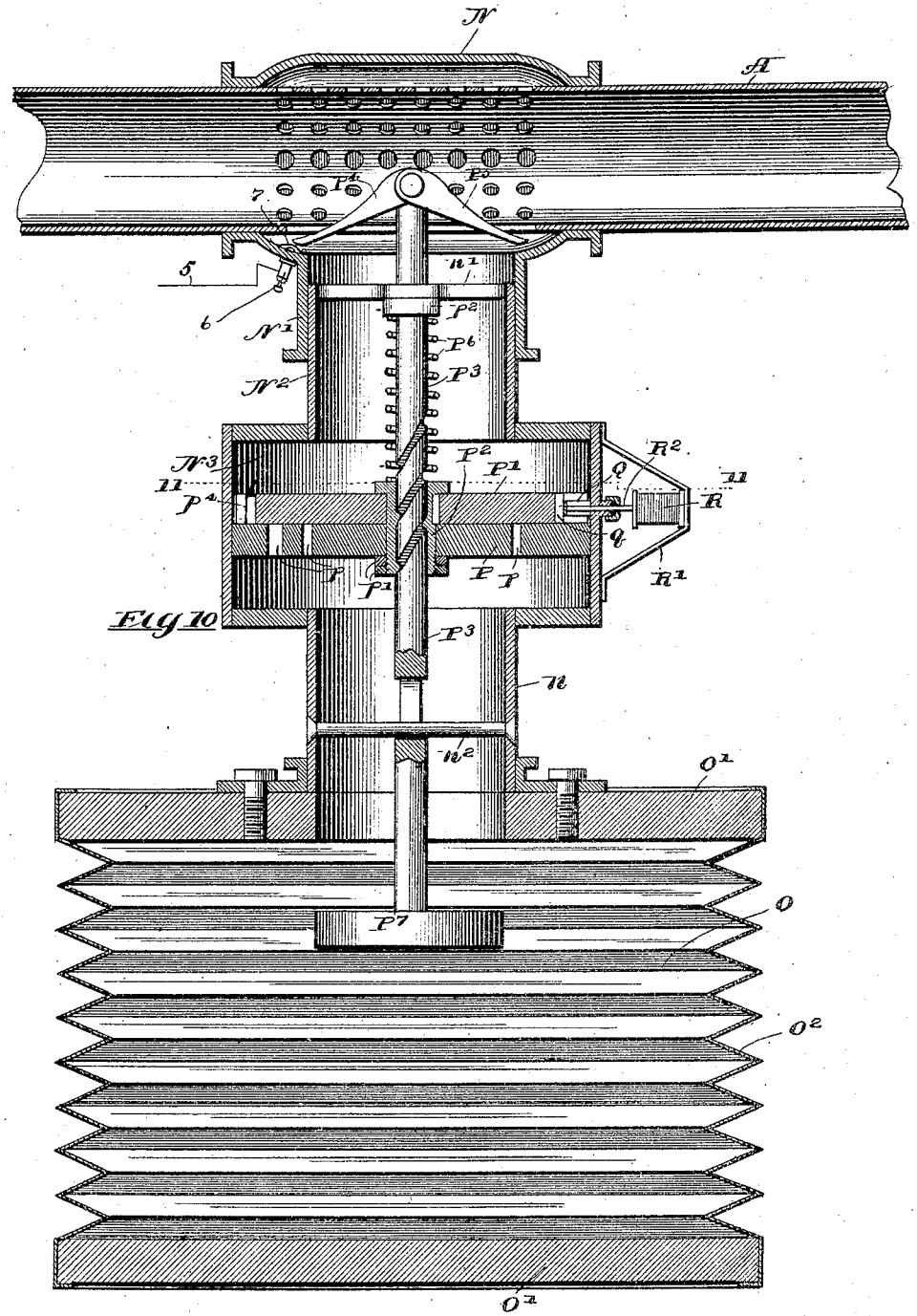

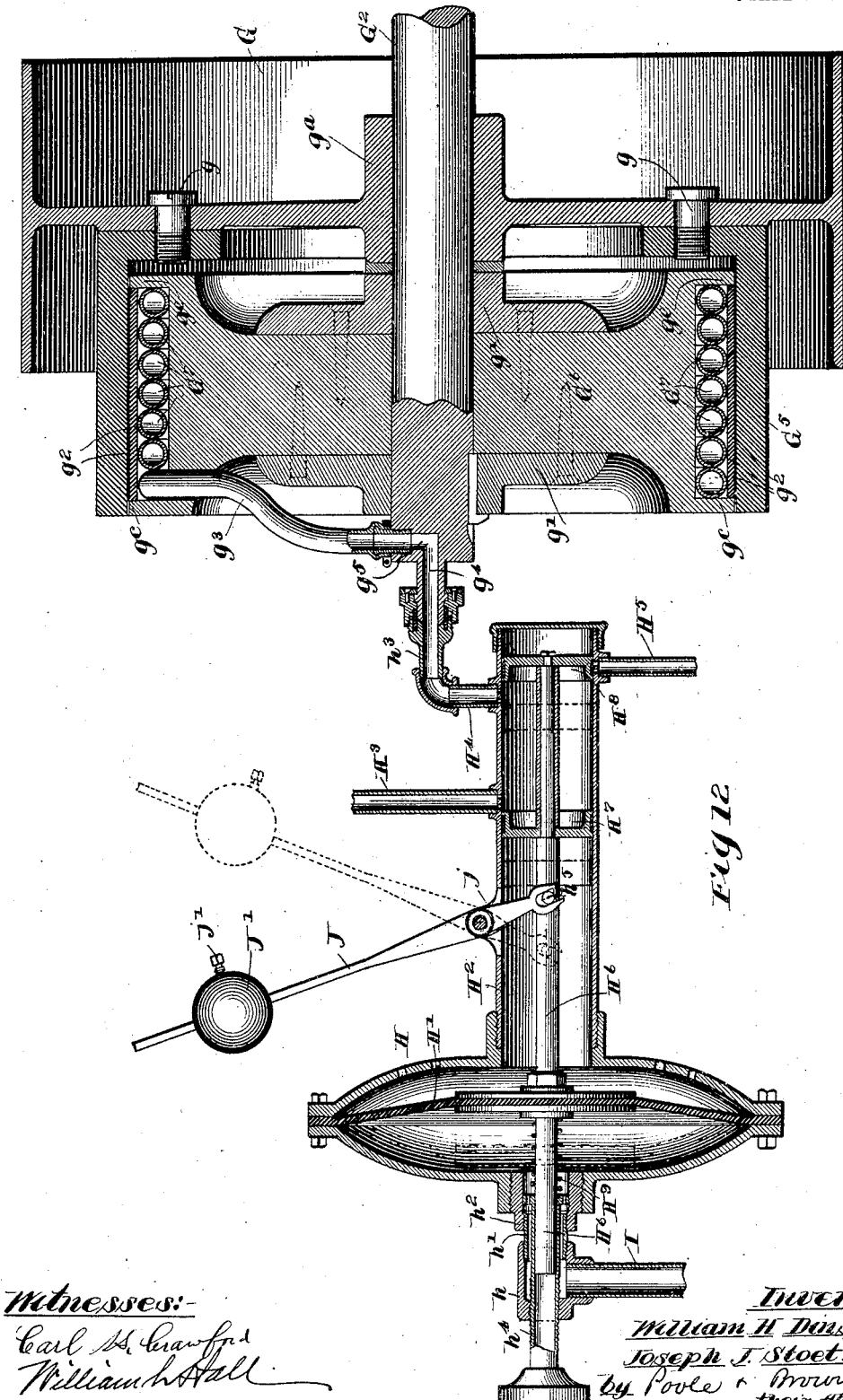

No. 789,799. Patented May 16, 1905.

UNITED STATES PATENT OFFICE.

WILLIAM H. DINSPEL AND JOSEPH J. STOETZEL, OF CHICAGO, ILLINOIS, ASSIGNORS TO THE UNIVERSAL PNEUMATIC TRANSMISSION COMPANY, OF CHICAGO, ILLINOIS, A CORPORATION OF MAINE.

PNEUMATIC-DESPATCH-TUBE SYSTEM.

SPECIFICATION forming part of Letters Patent No. 789,799, dated May 16, 1905.

Application filed August 15, 1902. Renewed April 1, 1904. Serial No. 201,118.

*To all whom it may concern:*

Be it known that we, WILLIAM H. DINSPEL and JOSEPH J. STOETZEL, of Chicago, in the county of Cook and State of Illinois, have invented certain new and useful Improvements in Pneumatic-Despatch-Tube Systems; and we do hereby declare that the following is a full, clear, and exact description thereof, reference being had to the accompanying drawings, and to the characters of reference marked thereon, which form a part of this specification.

This invention relates to pneumatic-despatch-tube systems; and the object of the invention is to improve and simplify the construction and operation of systems of this character as a whole and also to improve the details of such systems.

The invention is herein shown as embodied in a vacuum system, and while the several features thereof are especially applicable to this type of system it will be observed that certain of the features of the invention may be applied to pressure systems.

The invention consists in the matters hereinafter set forth, and more particularly pointed out in the appended claims.

In the drawings, Figure 1 is a diagrammatic view of a pneumatic-despatch-tube system embodying our invention. Fig. 2 is a longitudinal section of an improved terminal constituting part of our invention. Fig. 3 is a longitudinal section taken on the indirect line 3 3 of Fig. 2. Fig. 4 is a transverse section taken on line 4 4 of Fig. 2. Fig. 5 is a longitudinal section taken through the despatch-box. Fig. 6 is a longitudinal section taken on line 6 6 of Fig. 5. Fig. 7 is a transverse section taken on line 7 7 of Fig. 5. Fig. 8 is a transverse section taken on line 8 8 of Fig. 5. Fig. 9 is a partial side elevation of the despatch-box, showing means for holding open one of the valves thereof. Fig. 10 is a central vertical section of the parts constituting a relay, showing in connection therewith in longitudinal section a part of the despatch-tube. Fig. 11 is a transverse section taken on line 11 11 of Fig. 10. Fig. 12 is a horizontal longitudinal section of the controlling-governor for the vacuum-pump. Fig. 13 illustrates the application of our invention to a short system.

As shown in said drawings and referring more specifically to Fig. 1, A designates a despatch-tube line which is provided at one end with a despatch-box B and at its other end with a terminal C. When the improvements constituting the invention are embodied in a vacuum system, the despatch-tube is provided near the terminal C with a vacuum-pipe D, which is connected with a tank D', and said tank is connected by a pipe $d$ with a vacuum-pump E, made of the usual or any preferred type. F designates an engine for operating said vacuum-pump, the piston-rod F' of which is connected with a horizontal crank-shaft $f$. Said crank-shaft is provided with a belt-pulley $F^2$, and said pulley is connected by a belt $F^3$ with a pulley G of a pressure-governor mechanism, which is indicated in Fig. 1 as a whole by G'. Said pulley G is normally loose on said shaft and is adapted to be locked thereto by a suitable clutch mechanism, constituting part of or controlled by said pressure-governor. Said clutch mechanism is shown in detail in Fig. 12. Said clutch mechanism embodies a horizontal shaft $G^2$, having on one end a crank-disk $G^3$, and said crank-disk is connected, by means of a pitman $G^4$, with the piston-rod of the vacuum-pump.

In the practical operation of the system illustrated a vacuum of a given number of inches is established and maintained therein through the instrumentality of the governing mechanism interposed between the engine and the vacuum-pump. In the illustrated system the despatch-tube is closed at both its receiving and discharge ends at times when a cartridge or cartridges are not being transmitted therethrough, so that at such times it is only necessary to operate the pump sufficiently to overcome or neutralize the leakage of air into the system. The predetermined vacuum in the system may be maintained by the pump E or an auxiliary pump, as will be hereinafter more fully explained. The governing mechanism for the primary pump is adapted to be variably actuated to arrest the operation of the vacuum-pump when the determined maximum vacuum is established in the system and such as is necessary for transmitting the cartridges or carrying devices therethrough, and said governing mechanism operates to start the vacuum-pump as soon as the despatch-door valves are opened to insert a cartridge into the despatch-tube. The governing mechanism is shown more clearly in Fig. 12 and is made as follows: The hub $g^a$ of the pulley G is mounted loosely on the shaft $G^2$ and is secured by bolts $g$ or like fastening means to a friction-ring $G^5$, which surrounds and is concentric with a pulley $G^6$, which is fixed by flanged collars $g'$ $g'$ on the rotative shaft $G^2$ in the manner shown in Fig. 12. Interposed between said friction-ring and pulley is a spiral coil of flexible pipe $G^7$, which is held accurately in place by means of flanges $g^c$ at the sides of the pulley $G^6$. Preferably the inner surface of the friction-ring $G^5$ is faced with a suitable friction layer $g^2$ of rubber, leather, or like material. One end of the flexible pipe $G^7$ is closed, while the other end is carried outwardly away from the space between the friction-ring and pulley and constitutes the supply-pipe $g^3$ of the coil which is adapted for connection with a source supplying water or other fluid under pressure. When the coil is filled with fluid, it expands and constitutes a frictional connection between the ring $G^5$ and pulley $G^6$ in a manner to operatively connect the engine with the vacuum-pump, and when a portion of the fluid is discharged from the coil the frictional connection is broken and the engine disconnected from the pump. The supply of fluid to said pipe and coil is controlled by variations of the vacuum in the system in such manner that when the vacuum falls below a certain minimum the fluid is admitted to the coil, and when the vacuum exceeds a certain maximum the fluid is released from the coil. The vacuum-controlled governing mechanism controlling the supply of liquid to said coil embraces a casing H, within which is contained a diaphragm H'. The wall of the casing adjacent to the despatch-tube is imperforate, while the other wall is perforated. The side of said chamber between the diaphragm and the imperforate wall communicates by a pipe I with the despatch-tube A, Fig. 1, whereby one side of said diaphragm is subject to the influence of the vacuum in the system, while the other side of the diaphragm is subject to the influence of air at atmospheric pressure through the perforations in the adjacent wall of the chamber. The pipe I communicates with a fitting $h$, which is connected by a tube $h'$ with a nipple $h^2$, fitting within an opening in the adjacent side wall of the casing H, whereby communication is established between the pipe I and said casing. Connected with said casing H, centrally thereof and on the side remote from the pipe I, is a short horizontal tube $H^2$, which is closed at its end remote from the said casing. Said tube is provided some distance from its closed end with a water-inlet pipe $H^3$ and between said pipe $H^3$ and the closed end thereof with a pipe $H^4$, which communicates with the pipe $g^3$ of the flexible coil $G^7$. The connection between said pipe $H^4$ and the pipe $g^3$ is herein shown as made as follows: The end of the rotative shaft $G^2$ is reduced and provided with an axial passage $g^4$, which communicates at its inner end inside of the enlarged part of the shaft with a radial port $g^5$, which latter communicates through a suitable fitting with the pipe $g^3$. Said coil $G^7$ rotates with the pulley $G^6$, being confined between the lateral flanges $g^c$ at the sides thereof, and the supply-pipe $g^3$ therefore rotates with said shaft and pulley. The pipe $H^4$ communicates with a pipe $h^3$, which is non-rotative, and said pipe $h^3$ is connected with the reduced extension of the shaft containing the axial passage $g^4$ through the medium of a stuffing-box constructed to provide a fluid-tight joint between said rotative and non-rotative parts. $H^5$ designates a waste-water pipe leading from the lower side of the tube near the closed end thereof. Connected centrally with the diaphragm H' and extending centrally through the tube and also outwardly in a sleeve $h^4$, contained within the fitting $h$, is an endwise-reciprocatory stem $H^6$. Said stem has close guiding engagement with the sleeve $h^4$. The stem $H^6$ is provided within the tube $H^2$ with two cylindric valves $H^7$ $H^8$, which former fits closely within the tube $H^2$ between the fluid-supply pipe $H^3$ and the diaphragm-chamber. The former valve $H^7$ is provided to prevent the passage of fluid to the end of the tube adjacent to the diaphragm-casing, while the latter valve, $H^8$, is located near the closed end of the tube and controls the passage of water from the tube to the pipes $H^4$ and $H^5$. When the valves and diaphragm are in the positions shown in full lines in Fig. 12, fluid supplied to the tube passes through the pipe $H^4$ to the coil $G^7$. The entrance of liquid to said coil expands said coil, and said coil when expanded acts to frictionally lock the friction-ring $G^5$ and attached pulley G to the pulley $G^6$ and therethrough to the shaft $G^2$. When the parts are locked in this manner, they constitute a connection between the engine and vacuum-pump whereby the latter is operated to induce the appropriate vacuum in the system. When the vacuum in the system reaches a certain maximum, the diaphragm H' is forced outwardly by atmospheric pressure toward the despatch-tube, carrying with it the stem $H^6$ and the valves $H^7$ and $H^8$ to the positions shown in dotted lines. In these positions of the parts the valve $H^8$ is moved inwardly beyond the pipe $H^4$ and out of line with the waste-pipe $H^5$, thereby permitting a portion of the liquid in the coil to pass off through the waste-pipe. The partial emptying of the said coil $G^7$ contracts the same, so that the friction-ring $G^5$ is allowed to rotate freely on the shaft $G^2$, whereby no motion is imparted from the engine to the vacuum-pump. Upon a decrease of the vacuum in the system the parts will be returned to the position shown in full lines in Fig. 12, fluid permitted to enter the coil $G^7$, and the vacuum-pump again started in operation. The influence of atmospheric pressure on said diaphragm is opposed by a spiral expansively-acting spring $H^9$, which surrounds the part of the stem between the diaphragm and the fitting $h$. Said spring is interposed between said diaphragm and the inner end of the tube $h^4$, with which latter the stem has sliding engagement. The tension of the spring is variable to vary the amount of vacuum required to actuate the governing mechanism. As herein shown, said sleeve $h^4$ has screw-threaded engagement with the fitting $h$ and is provided on its outer end with a finger-piece, whereby upon rotation of the sleeve said sleeve is moved endwise toward and away from the spring to vary the tension thereof to suit the requirements. Said governing mechanism is provided with a device for preventing slight variations of the vacuum in the system from operating said mechanism. Said device consists of a lever J, which extends upwardly from the tube $H^2$ and is pivoted upon a bracket $j$ at one side of said tube. The inner end of said lever extends through an opening in said tube, and the extreme end of said lever is provided with a notch which engages a lug $h^5$ on the stem $H^6$. Upon the outer end of said lever is mounted a sliding weight $J'$, which is adapted to be affixed to the lever at varying distances from its ends by means of a set-screw $j'$. The said weight and lever act to hold the parts at either limit of their movements and exert force to prevent slight variations of the vacuum in the system from operating the governing mechanism. Variations of vacuum in the system tending to shift the valves $H^7 H^8$ is resisted by said weighted lever until the lever passes the vertical, after which the weight assists to throw the valves to one limit of their movement.

The details of the despatch-box B are illustrated in Figs. 5 to 9, inclusive. Said despatch-box consists principally of a casting having two oppositely-located generally rectangular chambers $B' B'$. The top and end walls $b' b'$ of said chambers are made integral with each other, and said top walls are curved outwardly and downwardly, as shown in Fig. 5. The box is affixed to the despatch-tube A by means of an integral collar $b^a$, which is slipped over and fastened to said tube. The side walls $b^2$ of the chambers are removably attached to the top and end walls thereof to permit the insertion and removal of the valves located in said box. Said despatch-box is provided with a flaring receiving end or mouth $B^2$, which is made integral with the box, as herein shown. Said receiving end or mouth of the box is made circular in cross-section and is continued upwardly in said box to provide at the sides thereof adjacent to the side walls $b^2$, Figs. 5 and 6, guides for the cartridges as they are inserted into said box. The sides of said circular prolongations of the receiving-mouth of said box adjacent to the chambers $B'$ are obliquely cut away, as most clearly shown in Figs. 5 and 6, the other sides of said prolongation constituting triangular-shaped guides $b^3$ for the cartridges.

$B^3 B^3$ designate swinging gates or valves which are provided at their lower margins with enlarged parti-cylindric projections $b^4$, which fit in corresponding inwardly-opening recesses or sockets in the inner faces of the end walls of the box near the lower margins thereof, this construction affording pivotal connection of the valves with the box, permitting them to move toward and from each other. The valves when in their closed positions converge and meet at their upper ends above the pointed ends of the guides $b^3$, so as to provide an air-tight joint between the same. Said valves also when closed fit closely upon the inclined margins of the tapered guides $b^3$, as clearly shown in Fig. 5, the fit between said guides and valves being sufficiently close to prevent the passage of any considerable amount of air between said parts. The two valves $B^3$ constitute what may be termed a "duplex" valve, and so far as the broader features of our invention are concerned the construction of the valves may be varied to conform to different forms of despatch-boxes.

The valves $B^3$ are provided at or near their upper margins with curved wings $B^4$, which are concentric with the pivots thereof, and said wings have sliding engagement with projections $b^5$, formed on the inner faces of the upper walls of the chambers, such as will provide air-tight joints between the wings and said upper walls. The upper walls of the chambers $B'$ are perforated to admit air at atmospheric pressure to the chambers in rear of the valves, and the inner or adjacent faces of said valves are also subject to atmospheric pressure through the receiving-mouth of the box. The areas of the inner and outer faces of each valve are preferably approximately equal, so that said valves when influenced by the atmospheric pressure alone are substantially balanced. When said valves are balanced in the manner described, they are provided with quick-closing devices consisting of springs $B^5$, located in the chambers $B'$ and interposed between the end walls of said chambers and the inner faces of said valves. With this construction when a cartridge is inserted into the despatch-box only sufficient force need to be exerted as will overcome the springs $B^5$, and when said cartridge has passed the valves and the valves are otherwise free said springs act to quickly close the valves and cut off the admission of air to the pipe A therebetween. If desired, however, the areas of the rear or inner faces of the valves may be made greater than the adjacent faces thereof, so that the valves may be closed by the atmospheric pressure. The construction shown, however, is preferred, for the reason that in order to secure a quick-closing action of the valves by air-pressure said valves would need to be overbalanced to such an extent as to require considerable force to insert a cartridge between the same into the despatching-tube.

It is desirable that one or both of the valves shall remain open for a short time after the cartridge has passed into the despatch-tube, so as to admit air at atmospheric pressure to the despatch-tube behind the cartridge until said cartridge has passed some distance into the tube. The result of this operation is that the cartridge is advanced a greater distance and at greater speed through the tube than would be true if said valves were closed immediately after the cartridge has passed the same. Mechanism for effecting this result is herein illustrated and is made as follows: The pivotal enlargement $b^4$ of one of the valves is reduced at one end, and said reduced part extends outwardly through the adjacent side wall $b^2$ of the despatch-box and is provided outside said side wall and parallel therewith with a rigidly-attached arm $B^6$, as shown most clearly in Fig. 9. Located in rear of the upper end of said arm $B^6$ is an endwise-movable detent $B^7$, which is formed on the end of a short rod $B^8$, which has endwise-sliding engagement with guide-lugs on the side wall of the box. Said detent-rod is advanced into the path of said arm $B^6$ by a spiral spring $B^9$, surrounding the same and is retracted or shifted backwardly against the action of said spring. The upper end of said rod constitutes the core of a solenoidal magnet $B^{10}$. Said magnet is mounted on the side of the despatch-box and is included in an electric circuit hereinafter to be described, which is closed by circuit-closing devices located in the despatch-tube and operated by the passage of a cartridge thereover. When the door associated with said arm $B^6$ is opened by the insertion of a cartridge into the despatch-box, said arm is swung backwardly against the detent, and by reason of the inclined contacting surfaces of the detent and arm said detent is pushed upwardly to allow the arm to pass the same, after which said detent resumes its normal position under the action of its spring in front of said arm $B^6$ and locks said valve in its open position. Said valve remains open until the cartridge strikes the circuit-closing devices located in the despatch-tube referred to, at which time the magnet $B^{10}$ is energized and retracts the detent and permits the arm $B^6$ to swing past the same, and thereby permits the closing of the door associated therewith under the action of its closing-spring $B^5$.

The terminal through which the cartridges are delivered from the despatching-tube is shown in detail in Figs. 2 to 4, inclusive. Said terminal is normally closed and is opened only at the time of the delivery of a cartridge from the system. Said terminal consists generally of two sets of valves located one in advance of the other and connected by a closed tube-section. In the normal position of the parts the valves nearest adjacent to said despatch-tube are open, while the valves at the end of the terminal are closed and are held closed by reason of the vacuum existing in the system. When a cartridge is ejected from the despatch-tube through the terminal, the upper valves are closed to cut off the lower valves from the influence of the vacuum in the despatch-tube, and at this time the lower valves may be readily opened by the weight of a cartridge and its contents, assisted by the momentum thereof.

The upper valve mechanism of the terminal consists of a box provided with a cylindric collar $c$, by which it is attached to the adjacent end of the despatch-tube, and said box is made of the same general shape as the despatch-box, with the exception that its position is reversed with respect to said tube. Said upper terminal-box contains two oppositely-located chambers $C'$ $C'$ of generally rectangular form, having oblique end walls $c'$ and curved bottom walls $c^2$. Said upper terminal-box is provided with a cylindric guide $c^a$, which extends from the tube a distance into said box. Said guide is cut obliquely away at its sides adjacent to the chamber $C'$ to form oblique seats, against which the valves $C^2$ (made generally like the valves of the despatch-box before described) are seated, said valves being designed to meet just below the pointed ends of said triangular guides to form a closure to prevent the free passage of air between the same. Said valves also fit closely upon the inclined margins of said guides in a manner similar to the valves of the despatch-box before described. Said valves are provided with particylindric enlargements $c^3$ at their upper margins, which engage correspondingly-shaped recesses or sockets in the end walls of the chambers and afford pivotal engagement of said valves with the box to permit the valves to move toward and away from each other. Said valves or gates are provided with curved wings, which are concentric with respect to the axis of rotation of the valves, and said wings are adapted to engage projections $c^4$ on the inner faces of the lower curved walls of the chambers $C'$ to form air-tight joints between said parts. Spiral contractile springs $C^4$, each attached at one end to one of the valves and at its other end to a lug on the inner face of the end wall of the adjacent chamber, act to hold said valves open when the air-pressure on both sides of the valves is equalized, as will hereinafter more fully appear. The lower end of the upper terminal-box is provided with a tubular flange or extension $c^5$, within which fits a tube $C^5$, which constitutes an extension of the despatch-tube and extends between the upper and lower terminal-boxes in axial alinement with the despatch-tube A. The lower terminal-box is made substantially like the upper box, and the similar parts thereof and the valves bear like reference-letters. Said lower valves are held normally closed by reason of the vacuum existing in the system, it being understood that when the system is not in use the upper gates are open and the lower gates closed. The lower walls $c^2$ of the lower terminal-box are perforated to admit air into the chamber $C'$ in rear of said valves or gates.

When the cartridge strikes the lower valves of the terminal in its passage therethrough, the tube $C^5$ is filled with air at atmospheric pressure, as will be hereinafter explained, and it is desirable that the lower valves be nearly balanced to permit the same to be readily opened, the slight overbalance acting in directions to close the valves. Quick-acting closing-springs $C^6$, similar to those of the despatch-box, are employed to close the valves quickly. The overbalance of the lower valves added to the force exerted by the springs $C^6$ will always be less, of course, than the force exerted by the lightest cartridge and its contents, which will pass through the terminal.

Means are provided for closing the upper valves of the terminal after a cartridge has passed therethrough and before it has reached the lower valves, so as to cut off the tube $C^5$ and lower valves from the main despatch-tube and for also admitting air to the tube $C^5$, so as to free the lower valves from the influence of the vacuum of the system and permit the cartridge to pass readily out of the terminal. The mechanism for effecting these results is made as follows: K K designate two small pipes located one on each side of the tube $C^5$. Each of said pipes K communicates at one end with one of the chambers $C'$ of the lower terminal-box and at its other end with the corresponding chamber of the upper box. The upper ends of said pipes K communicate with the chambers of the upper terminal-box through the medium of valve-chambers $K'$, formed on the lower curved walls of the upper terminal-box, said valve-chambers communicating with the chambers $C'$ through ports $k$ in the lower curved walls of said chambers $C'$. Within said valve-chambers are located hollow cylindric rotative valves $K^2$, each of which is provided on its opposite sides with ports, which ports are adapted to register with ports $k'$, formed in the lower walls of the valve-chambers $K'$, and the ports $k$, through which the valve-chambers communicate with the chambers $C'$ of the upper terminal-box. The ports of the valves $K^2$ are normally out of register with the ports $k\,k'$. When the ports of the hollow cylindric valves are brought to register with the ports $k\,k'$, the chambers $C'$ of the upper terminal-box are in open communication with the atmosphere, so that atmospheric pressure is admitted behind the upper valves to close the same against the action of the springs $C^4$. The means for actuating said hollow cylindric valves are made as follows: L L designate two actuating-levers the inner ends of which extend through openings in the tube $C^5$ into the path of a cartridge as it passes through the terminal. Said levers are pivoted to plates $l$, attached to the outer sides of the tube in any suitable manner. The outer ends of said levers L, within the pipes K, are pivotally connected with links $L'$, which are contained within said pipes, and said links are pivotally connected at their upper ends with arms $K^3$, which are rigid with said cylindric hollow valves $K^2$. It will be seen, therefore, that when a cartridge is passing through the tube $C^5$ it strikes the actuating-levers L and effects rotation of the valves $K^2$ in such manner as to permit the air at atmospheric pressure to enter the chambers $C'$ of the upper terminal-box, and thereby close the upper valves of said terminal. Communication is afforded between said tube $C^5$ and the chambers $C'$ of the upper terminal-box through the medium of small openings $c^6$ in the curved wings of said upper valves, so that when said valves $K^2$ are opened and atmospheric pressure is established in rear of the upper valves and the valves closed said atmospheric pressure is transmitted through the openings $c^6$ to the interior of the tube $C^5$ behind the cartridge as it passes through said tube, whereby the full weight of the cartridge and its contents and the momentum thereof is utilized to open the lower valves of the terminal. There will of course be a slight air-cushion in front of the cartridge as said cartridge passes to the lower valves, and said cushion will act to prevent abrupt concussion of the cartridge on the lower valves. As soon as the cartridge passes the lower valves the springs $C^6$, assisted by the overbalance of the valves, act to quickly close the valves. After the cartridge has been discharged from the terminal the upper valves are gradually opened, and for this purpose it is necessary to close the valves $K^2$ to prevent the further admission of atmosphere into the chambers $C'$ of the upper terminal-box. The means provided for closing said valves $K^2$ are made as follows: M M designate links located in the pipes K and which are pivoted at their upper ends to the links L L, which actuate said valves $K^2$, and at their lower ends to the upper ends of bell-crank levers $M'$, which latter are pivoted at their angles to lugs $c^7$ on the inner faces of the end walls of the lower terminal-boxes. The free ends of said bellcrank levers project toward the gates or valves $C^2$.

The operation of the several parts just described is as follows: When a cartridge passes between the levers L L and therethrough opens the cylindric valves $K^2$ to permit air to pass into the chambers $C'$ of the upper terminal-boxes, the free ends of the levers $M'$ are by the same movement thrown inwardly toward the valves $C^2$ of the lower terminal-box. When said valves $K^2$ are opened in the manner described, air under atmospheric pressure is allowed to pass into the chambers $C'$ of the upper terminal-box and close the upper valves $C^2$ and also pass into the tube $C^5$ in rear of the traveling cartridge. As said cartridge progresses and strikes the lower terminal-valves said valves are thrown outwardly to the full diameter of the tube to permit the cartridge to pass therebetween, and while being swung outwardly strike the free ends of the bell-crank levers $M'$ and act therethrough and the links $L'$ $L'$ to restore the levers L L to their normal positions and through the links $L'$ to close the valves $K^2$. After the cartridge passes outwardly between the lower valves $C^2$ of the terminal said valves are closed. At this time the air in the upper chambers $C'$ and the tube $C^5$ is under atmospheric pressure, while in the despatch-tube A of the system on the opposite side of the upper valves of the terminal the normal vacuum of the system exists. If such conditions should prevail indefinitely, the upper gates or valves would not open. In order to permit the upper valves to open, said valves $C^2$ of the upper box may be made to fit somewhat loosely upon their seats, so as to permit the air in the tube $C^5$ and the chambers $C'$ to slowly leak into the despatch-tube of the system, and thereby equalize the pressure on the upper and lower sides of the upper pair of valves. When this occurs, the springs $C^4$ act to swing the valves open. As soon as the upper valves are thus opened the vacuum of the system is exerted on the lower gates of the valves $C^2$ to hold the doors closed. In this position of the parts the terminal is in readiness to discharge another cartridge, which may pass therethrough, the operation of discharging said cartridge being of course the same as that hereinbefore described. The duplex upper and lower valves $C^2$ of the terminal may in some instances be replaced with valves of other types. The form herein shown is an advantageous one and is therefore hereinafter made the subject of specific claims.

As a further improvement in pneumatic-despatching-tube systems, and which may be applied to a vacuum or a pressure system, we provide means for admitting air behind the cartridges at one or more points in the line after passing the despatch-box, thereby increasing the speed of the cartridges and also making it possible to install lines of despatching-tubes of any desired length with a practical strength of tube and under economical operating conditions. The device for introducing air into the despatching-tube in rear of the traveling cartridge is herein termed a "relay," and the number of relays used in a line will depend upon the length of the line and the conditions with respect to pressure in said tube. If the relays be applied to a vacuum system, said relays are operated to admit air under atmospheric pressure in rear of the cartridges, and if applied to a pressure system are constructed to admit air under a pressure greater than the impelling force which carries said cartridges through the system.

The manner of incorporating a number of relays in the system is shown in Fig. 1, and the construction of a single relay is shown in Fig. 10. As shown in said Fig. 10, N designates a casing which surrounds the despatch-tube A. Said casing fits tightly around said tube at its ends and is made larger than said tube between its ends, and the tube is provided within the enlarged part of the casing with perforations to permit air to pass from said casing to the interior of the tube. The casing is provided on one side with a tubular nipple $N'$, which communicates with a short pipe $N^2$, which latter is in communication with a valve-chamber $N^3$, the valve-chamber thus having direct communication with the despatch-tube A. The valve-chamber $N^3$ is connected by a tubular projection $n$ with the interior of a bellows or like construction O. Said bellows consist of upper and lower horizontal rigid walls $O'$ $O'$ and flexible folding side walls $O^2$. Said flexible walls $O^2$ are made of a material having considerable porosity, so that when the bellows is expanded air flows slowly thereinto through the pores of said side walls. Said pores, however, are made so small that when the bellows is contracted comparatively little air will find its way into the bellows through the pores of said side walls. A suitable material for making such side walls is a rather loosely-woven canvas. The passage between the interior of the bellows and the despatch-tube is provided with a suitable valve (located in the valve-casing $N^3$) which remains normally closed, but is adapted to be opened when a cartridge is passing by said relay to permit the admission of air from said bellows to said despatch-tube in rear of the cartridge. The valve mechanism herein shown and the means for operating the same are made as follows: P designates a horizontal disk located in the valve-chamber $N^3$ and extending entirely thereacross and provided with a plurality of ports $p$. $P'$ designates a flat rotative valve provided with a plurality of apertures which are adapted by rotation of the valve to be brought into and out of register with the ports of the disk P. The ports in said valve and seat are shown as circularly disposed about the axis of said disk, Fig. 11. P² designates a sleeve which extends through central registering openings in the disk P and valve P'. Said sleeve is provided at its upper end above the valve with a radial annular flange and at its lower end below the disk P with screw-threaded nuts $p'$, by which the valve is held on said disk. The sleeve P² is keyed or otherwise non-rotatively fixed to the valve, but is free to rotate in the disk P. P³ designates an endwise movable and rotative stem which has sliding engagement with a guide $n'$ near the top of the nipple N² and is slotted near its lower end to receive a transverse guide-pin $n^2$ near the lower end of the tube $n$. Said stem extends through the sleeve P². Said sleeve is provided interiorly thereof with a spiral rib constituting a screw-thread, which engages a corresponding screw-thread formed in the cylindric face of the stem. When the stem is moved endwise, therefore, the valve is rotated and the extent of angular movement is sufficient to bring the coacting ports into register. The stem projects upwardly through an opening in the despatch-tube into the path of the cartridges and is provided with trip-arms P⁴ P⁵, which are pivoted at their ends to said stem and are inclined downwardly and oppositely from each other. The nipple N' is provided with recesses to receive the ends of said arms. The valve-stem is held normally projected with its upper end into the tube by means of a spiral expansion-spring P⁶, which surrounds the valve-stem and is interposed between the upper end of the sleeve P² and a collar $p^2$, surrounding the valve-stem adjacent to the guide $n'$. Said collar $p^2$ constitutes a stop to limit the upward movement of the valve-stem. Said arms are therefore located in the path of the cartridges which pass through the despatch-tube, and being inclined outwardly away from the stem the cartridge acts on one of said arms to depress the stem against the action of the spring P⁶ as it passes the relay, and the depression of said stem serves to rotate the valve to bring the ports thereof into register with the ports of the disk P and permit air at atmospheric pressure to pass from the bellows through the valve into the despatch-tube in rear of the traveling cartridge.

The valves of the relays are held in their open positions by the following mechanism: Q, Fig. 11, designates a spring which is located inside the valve-casing N³. Said spring is located above the disk P in a notch in the margin of the valve plate or disk P'. The spring is attached at one end to the valve-casing and slides freely at its other end upon said casing, and its central part is bent inwardly toward the notched margin of the valve-disk. Said spring is provided near its center with a holding or detent lug $q$, which is adapted to enter one of two notches $p^3$ $p^3$ in the notched margin of the valve-disk, the lug $q$ being adapted to engage one of said notches when the valve is at either limit of its rotative movement. The valve-disk is provided opposite said spring with a marginal notch which coöperates with a stud $p^4$, extending upwardly from the disk P, and is adapted to afford a positive stop or check to the rotative movement of the valve if such movement be not checked by the yielding stop described. The valve is shown in Figs. 10 and 11 in its closed position and is opened by rotating the closure on its axis until the apertures therein are brought into register with the apertures of the plate P. The spring Q is made of sufficient strength to withstand the tendency of the spring P⁶ to return the valve to its closed position so long as the stop-lug $q$ of said spring is in engagement with one of the notches $p^3$ of the valve-disk.

It will be understood that when the valve is opened in the manner described the vacuum existing in the despatch-tube will draw the air from the bellows and cause the bellows to contract, the lower wall rising toward the upper wall thereof. The pores of the material constituting the side walls of the bellows are made so small as to prevent the leakage of any considerable amount of air into the bellows during the time when the valve is opened, so that the charge of air to be admitted into the despatch-tube behind each cartridge may be approximately measured, the bellows constituting an air-charge-measuring chamber. It is desirable that the relays remain open to permit the admission of air to the despatch-tube for a little time after the cartridge has passed each relay. Such period of opening after the cartridge has passed the relay may be varied to suit the special requirements of each particular installation. As herein shown, electrically-actuated means are provided for releasing the air-valves of the relays to permit the same to close, and the circuits in which the valve-releasing devices are included are closed by circuit-closers located in the path of the cartridges, each valve being thus released after the cartridge opening the same has passed some distance beyond the valve. In case the valve of a relay should not be released by the electrically-controlled devices mentioned and the valve of said relay therefore remains open for a longer period than designed the continued contraction of the bellows will bring the bottom wall thereof into contact with a disk P⁷, attached to the lower end of the valve-stem, raise said stem, and thereby close the associated valve. After the valve has been closed the bellows gradually expands and permits the admission of air thereinto through the porous side walls thereof.

The solenoidal magnet B¹⁰, by which the despatch-box valve is released, is included in a circuit provided with circuit-closing devices which are actuated to close the circuit at or before the time a cartridge passes the first relay of the system. As herein shown, the relay-valves and the despatch-box valves are adapted to be kept open after once being opened until the cartridge reaches the next succeeding relay or the terminal of the system, so that as the system is designed air at atmospheric pressure constantly follows the cartridge through the system. The circuit-closing devices for closing the circuit of the valve-releasing device for the last relay are herein shown as located at the terminal. The releasing of the relay-valves may be effected by other than electrically-actuated means.

The electrically-controlled devices for actuating the detent-springs Q of the relays to release their valves consist of solenoidal magnets R, which are supported on brackets R', affixed to the valve-casings. The core $R^2$ of each solenoidal magnet extends through the valve-casing, the casing being provided with a suitable stuffing-box to prevent the escape of air. The inner end of the core-rod is attached to the detent-spring in the manner shown in Figs. 10 and 11. With this construction when the magnet-circuit is closed the core of the magnet is drawn outwardly and releases the spring-detent lug $q$ from the valve-disk, thereby permitting the said valve to be closed under the action of its spring $P^6$.

As shown in Fig. 1, the system illustrated is provided with two relays, No. 1 and No. 2. The circuit between relays No. 1 and No. 2 embraces a wire 3, which is connected with one end of the solenoidal magnet R of relay No. 1, battery 4, wire 5, which is connected with the circuit-closing devices at No. 2 relay, the despatch-tube A extending between said relays Nos. 1 and 2, back to magnet R. Wire 5 is connected with a binding-post 6 at relay No. 2, which extends through the casing N near the end of the arm $P^4$ of the valve-stem and is provided with an exposed contact inside of the casing, Fig. 10. 7 designates a spring-contact located just inside the contact end of said binding-post 6. Said spring-contact is attached at one end to the inner face of the casing-wall and has sliding engagement at its other end with said wall, as shown in Fig. 10. When said valve-stem $P^3$ is depressed and the arm $P^4$ moved downwardly and outwardly, it forces said spring into contact with binding-post 6 and closes the circuit which energizes the solenoidal magnet R of relay No. 1, which retracts the spring-detent and permits the valve of relay No. 1 to close. The solenoidal magnet $B^{10}$, which releases the door of the despatch-box after the cartridge has passed therethrough, as heretofore described, is likewise included in an electric circuit which is closed at the time the cartridge passes relay No. 1, it being understood that said relay No. 1 has circuit-closing devices (such as 6, 7, $P^4$, &c.) like that illustrated in Fig. 10 and just described. The circuit between said closing devices at relay No. 1 and the solenoidal magnet at the despatch-box embraces wire 8, battery 9, wire 10, the said circuit-closing devices at relay No. 1, and the despatch-tube A between said despatch-box and relay No. 1. Similarly, the valve in relay No. 2 is released by circuit-controlled devices included in a circuit having closing devices located in the terminal C and which devices are actuated during the passage of a cartridge through said terminal. The circuit between the terminal and relay No. 1 embraces a battery 11, wire 12, a binding-post 13, a circuit-controlling device within the terminal, hereinafter to be described, the despatch-tube A extending to the relay No. 2, a wire 14 connecting said despatch-tube with the solenoidal magnet R of relay No. 2 and wire 15, connecting said magnet with battery 11.

The circuit-closing devices located in the terminal and adapted for actuation by the passage of a cartridge through the terminal are made as follows: 16, Fig. 2, designates a spring-contact located inside of one of the pipes K and partially in an enlargement $k^3$ at one side of said pipe. The binding-post 13 extends into said casing and is normally out of contact with said spring-contact 16. The spring-contact is moved outwardly into contact with the binding-post by means of a swell or enlargement on the adjacent link L', which is removed outwardly and upwardly when the levers L are thrown downwardly by the passage of the cartridge between the levers. When said spring-contact 16 makes contact with the binding-post, the solenoidal-magnet circuit of the relay No. 2 is closed and the valve of said relay released.

The operation of the system as illustrated will be understood from the foregoing and may be briefly recapitulated as follows: In despatching a cartridge through the tube A of the system the cartridge is inserted between the valves $B^3$ of the despatch-box. When that one of the valves associated with the locking-arm $B^6$ on the outside of said despatch-box is opened, such locking-arm is moved past the spring-detent $B^7$, whereby said valve is locked open until the cartridge reaches relay No. 1. As soon as such cartridge reaches relay No. 1 it acts upon the circuit-closer thereat and closes the circuit which actuates the solenoidal magnet $B^{10}$ and permits the valve or gate $B^3$, which has been held open, to close. When the cartridge passes relay No. 1, the valve thereof is opened by the mechanism described and is held open by the spring-detent provided therefor. As soon as said valve is opened air rushes from the interior of the bellows to the despatch-tube in rear of the traveling cartridge and causes the bellows to collapse. The bellows is made of such size that the air contained therein, together with that which leaks thereinto through the porous side walls thereof, is sufficient to carry the cartridge at a desired speed to relay No. 2, and when said cartridge reaches relay No. 2 it acts upon the circuit-closing devices thereat in a manner to release relay-valve No. 1 and cut off the supply of air therethrough. If for any reason the electrode-releasing mechanism should fail to operate, the bellows of relay No. 1 continues to contract until the bottom wall acts on the valve-stem $P^3$ to close the valve of said relay No. 1, it being understood that the force of contraction of said bellows is sufficient to overcome the spring-detent which holds open its valve. At the time said cartridge is acting to close the circuit which releases relay-valve No. 1 it operates to open the valve of relay No. 2 to open the same to admit air behind the cartridge, which is at this time traveling between relay No. 2 and the terminal, and air is admitted behind said traveling cartridge in the manner before described until the cartridge closes the releasing-circuit of relay No. 2 by its passage through the terminal C in the manner before described.

In a short line extending between closely-adjacent points, as in a store, the relays may not be required. In Fig. 13 is shown a simple system of this character, including a despatch-box S, despatch-tube T, and a terminal U. In this case one of the valves of the despatch-box is adapted to be held open during the time the cartridge is passing entirely through the despatch-tube and until it reaches the terminal. Said door is held open by the means before described, and the magnet of said electrically-controlled device is included in a circuit which embraces a battery 17, wire 18, circuit-closing devices in the terminal U, the pipe T, and wire 19, back to battery.

As hereinbefore stated, the governing mechanism located between the engine and vacuum-pump is so constructed that the vacuum-pump will only be operated during the time the system is in use for transmitting cartridges, assuming it to be possible to prevent the leakage of air into said system. In the practical installation of a system of this character, however, it is practically impossible to construct valves and pipe-fittings so as to prevent leakage of air into the system, so that while the system is standing idle in order to keep the same in condition to receive and transmit cartridges it is necessary to exhaust air therefrom to the extent which air leaks thereinto. This may be accomplished by the pump E, which in such event would be intermittingly operated during the cessation of the operation of the system to maintain the required vacuum therein. As a further improvement, however, I propose to employ for the purpose of maintaining the vacuum in the system during periods of disuse thereof an auxiliary air-pump V, which is operated from the crank-shaft of the engine F by means of a belt $v$, as clearly shown in Fig. 1. The exhaust-pipe V' of said pump is connected with the exhaust-pipe $d$, leading from the vacuum-tank D'. It is the intention that said auxiliary pump shall be made much smaller than the primary pump of the system and of such size that the constant operation thereof will neutralize the leakage of air into the system and will therefore maintain a practically constant vacuum in the system.

The system herein described is adapted for use either as a store system or long-distance commercial or postal system for conveying packages between distant points. The use of the relays described is of especial advantage when the invention is employed in the latter field, as it enables the system to be operated with pipes of practical size and dimensions and without danger of wasteful leakage of air and consequent loss of power.

It is understood that our invention is not limited to the specific details of construction shown in the accompanying drawings, but that such details may be varied in the practical carrying out of the invention as may be found necessary or desirable. It is also understood that the features specifically set forth in the several claims are intended to be separately claimed without limitation to the use in connection therewith of other features and details of construction illustrated.

We claim as our invention—

1. In a vacuum pneumatic-despatch-tube system, the combination with a tube provided with a receiving end and a discharge end, and valves acting to close the tube during periods of disuse of the system, of a pump, the vacuum side of which is connected with the discharge end of the despatch-tube, a motor for operating the pump, a governor located between said motor and pump and a pipe connecting the receiving end of the tube with said governor the vacuum acting upon said governor when a predetermined maximum vacuum is established in said tube to shut down the pump and, the governor operating to start the pump upon a drop of said vacuum below said maximum.

2. In a vacuum pneumatic-despatch-tube system, the combination with a tube, provided with a valved despatch-box and a valved terminal which are closed during periods of disuse of the system, of a primary and an auxiliary vacuum-pump, the latter being operated to neutralize the leakage of air into the tube during periods of disuse thereof and the former operating when a cartridge is inserted into the tube to induce a vacuum to transmit the cartridge therethrough.

3. In a vacuum pneumatic-despatch-tube system, the combination with a tube provided with a valved despatch-box and a valved terminal, which are closed during periods of disuse of the system, of a primary pump for establishing a vacuum in said system, means controlled by the vacuum in said system for shutting down said primary pump when a predetermined maximum vacuum is established in the system and operating to start the pump upon the insertion of a cartridge into said tube, and an auxiliary pump operated during periods of disuse of the system for neutralizing the leakage of air into the system.

4. In a vacuum pneumatic-despatch-tube system provided with a valved despatch-box and a valved terminal which are closed during periods of disuse of the system, a pump for establishing a vacuum in said system, a motor for operating said pump, a fluid-clutch connecting the engine with the pump, and means controlled by the vacuum in said system for regulating the supply of fluid to said clutch.

5. In a vacuum pneumatic-despatch-tube system, the combination with a tube provided with a valved despatch-box and a valved terminal which are closed during periods of disuse of the system, of a pump for establishing a vacuum throughout said system, means controlled by the vacuum in said system for shutting down said pump when a predetermined maximum vacuum is established in the system, and operating to start the pump upon the insertion of a cartridge into the tube, means for holding open the despatch-box valve for a time after the cartridge has passed the same, and means adapted to be operated by a traveling cartridge for releasing said holding mechanism.

6. In a pneumatic-despatch-tube system, the combination with a despatch-tube, of mechanism located at different points along the line of the tube each adapted to be operated for admitting air to the tube behind a traveling cartridge therein, means for operating said mechanism for admitting air, and means acting automatically on each mechanism to thereafter cut off the passage of air therethrough.

7. In a pneumatic-despatch-tube system, the combination with a despatch-tube, a despatch-box at one end thereof, and a terminal at the other end thereof, of one or more air-relays in the tube-line between said despatch-box and terminal, means for controlling the operation of said relays through the action of the traveling cartridges, to admit air in said tube behind said cartridges, and means also controlled by said traveling cartridges for thereafter cutting off the air through said relays.

8. In a pneumatic-despatch-tube system, the combination with a despatch-tube, a despatch-box at one end thereof, and a terminal at the other end thereof, of air-relays located in the tube-line between said despatch box and terminal, a valve in said despatch-box which is opened by the insertion of a cartridge into the tube and which is adapted to remain open to admit air into the tube until the cartridge reaches the first relay and to be then closed, and means for closing the last relay of the system at the time the cartridge passes out of the system through the terminal.

9. In a pneumatic-despatch-tube system, the combination with a despatch-tube provided at one end with a despatch-box and at its other end with a terminal, of a plurality of relays communicating with said despatch-tube between said despatch-box and terminal, a valve in said despatch-box which is opened by the insertion of a cartridge into the tube, means for closing the valve of the despatch-box and opening the first relay at the time the cartridge passes said first relay, the succeeding relays being opened as the cartridge passes the same, means for closing each relay as the cartridge passes the next succeeding relay, and means for closing the last relay as the cartridge passes through said terminal.

10. In a pneumatic-despatch-tube system, the combination with a despatch-tube provided at one end with a despatch-box and at its other end with a terminal, of one or more relays communicating with said tube between said despatch-box and terminal and adapted severally to be actuated by a cartridge as it passes through the tube, means for holding open the valve of the despatch-box until the cartridge has reached the first relay, means for opening the relays successively as the cartridge passes the same, means for holding open each relay until the cartridge reaches the next adjacent relay, means for holding open the last relay until the cartridge is discharged from the tube through said terminal, and electrically-controlled devices for releasing the valves of the despatch-box, and relays as the cartridge successively passes the several relays and the terminal.

11. In a pneumatic-despatch-tube system, the combination with a tube provided with a despatch-box and a terminal, of means for sealing the system during its periods of disuse, normally closed valves for admitting air to the tube behind the cartridge during its passage through the tube, means for opening said valves and means controlled by the passage of the cartridge through the tube for closing said valves.

12. In a vacuum pneumatic-despatch-tube system, the combination with a tube provided with a valved despatch-box and a valved terminal, relays communicating with the tube between the despatch-box and terminal, said relays embracing valves through which air at atmospheric pressure is admitted to the despatching-tube behind the cartridges as they pass therethrough, the valves of the system being closed during periods of disuse of the system, and means controlled by a cartridge in its passage through the tube to open and close the valves in a manner to continuously admit air behind the cartridge in its passage through the system.

13. In a pneumatic-despatch-tube system, the combination with a despatch-tube provided with a despatch-box and a terminal, and a relay in said tube between said box and terminal embracing a measuring-chamber for measuring the charge of air admitted through the relay to the tube.

14. In a pneumatic-despatch-tube system, the combination with a despatch-tube provided with a despatch-box and a terminal, a relay comprising a valve, a valve-actuating member projecting into the tube in the path of the cartridge, and means for measuring the charge of air directed through said valve.

15. In a pneumatic-despatch-tube system, the combination with a despatch-tube provided with a despatch-box and a terminal, of an air-relay between the despatch-box and terminal comprising a chamber communicating with said tube and with an air-measuring receptacle, a valve in said chamber, and a valve-actuating member projecting into the tube into the path of the cartridges.

16. In a pneumatic-despatch-tube system, the combination with a despatch-tube provided with a despatch-box and a terminal, of a relay between said despatch-box and terminal comprising a chamber or inclosure communicating with the tube, a valve in said chamber, a valve-actuating member projecting into the tube into the path of the cartridges, means for holding said valve open for a determined period after a cartridge passes the same, and means for releasing said valve to permit it to close.

17. In a pneumatic-despatch-tube system, the combination with a despatch-tube provided with a despatch-box and a terminal, of a relay between said despatch-box and terminal comprising a chamber or inclosure communicating with the tube, a valve in said chamber, a valve-actuating member projecting into the tube into the path of the cartridges for opening said valve, and means controlled by the traveling cartridge for closing said valve.

18. In a pneumatic-despatch-tube system, the combination with a despatch-tube provided with a despatch-box and a terminal, and a relay comprising an inclosure communicating with the tube and containing an air-valve, a valve-actuating member extending into the despatch-tube and into the path of the cartridges for opening the valve, means for locking said valve in its open position, and an electromagnet for releasing said valve, said magnet being included in a circuit having circuit-closing devices located in the path of the cartridges.

19. In a pneumatic-despatch-tube system, the combination with a despatch-tube provided with a despatch-box and a terminal, of a relay comprising an inclosure communicating with said tube, a disk extending across said inclosure and provided with a plurality of ports, a rotative valve engaging said stationary disk and provided with a plurality of ports adapted to register with the ports of the disk, and a valve-stem extending into the despatch-tube and into the path of the cartridges, said valve-stem having screw-threaded engagement with a part rigid with said valve, whereby, when the valve-stem is depressed by the passage of a cartridge thereover, said valve is rotated to bring the ports thereof into register with the ports of said disk.

20. In a pneumatic-despatch-tube system, the combination with a despatch-tube provided with a despatch-box and a terminal, of a relay comprising an inclosure, a disk extending across said inclosure and provided with a plurality of ports, a rotative valve engaging said stationary disk and provided with a plurality of registering ports, a valve-stem extending into the despatch-tube and into the path of the cartridges, said valve-stem having screw-threaded engagement with a part rigid with said valve, whereby, when the valve-stem is depressed by the passage of a cartridge thereover said valve is rotated to bring the ports thereof into register with the ports of said disk, a detent for locking the valve in its open position and means for releasing said detent.

21. In a vacuum pneumatic-despatch-tube system, the combination with a despatch-tube provided with a despatch-box and a terminal, of a relay located between said despatch-box and terminal comprising a bellows-like structure communicating with an inclosure which has communication with the despatch-tube, a valve in said inclosure, and a valve-actuating member extending into said tube and into the path of the cartridge, the air from said bellows, when the valve is open, being forced into said despatch-tube behind the traveling cartridge therein.

22. In a vacuum pneumatic-despatch-tube system, the combination with a despatch-tube provided with a despatch-box and terminal, of a relay located between said despatch-box and terminal comprising a bellows-like structure communicating with an inclosure which has communication with the despatch-tube, a valve in said inclosure, a valve-actuating member extending into said tube and into the path of the cartridges, the air from said bellows, when the valve is open, being forced into said despatch-tube behind the cartridges therein, and means operated by the closing of the bellows for closing said valve.

23. In a vacuum pneumatic-despatch-tube system, the combination with a despatch-tube provided with a despatch-box and a terminal, of a relay located between the despatch-box and the terminal comprising a bellows, the side walls of which are flexible and porous, an inclosure constituting a communication between said bellows and the despatch-tube, a valve located in said inclosure, and a valve-actuating member extending in the tube and into the path of the cartridges.

24. In a pneumatic-despatch-tube system, the combination with a despatch-tube provided with a despatch-box and a terminal, and valves in said despatch-box and terminal, of one or more relays located between said despatch-box and terminal and each provided with a valve which is adapted to be opened to admit air to the despatch-tube in rear of a cartridge passing therethrough, mechanisms acting severally to hold the valves of the despatch-box, and relays opened for a determined period, and electromagnetic means for releasing said valves, included in circuits provided with circuit-closing devices located in the path of the cartridges, the valve of said despatch-box being closed at the time a cartridge passes the first relay and the valve of each relay being closed at the time the cartridge reaches the next adjacent relay or the terminal.

25. A despatch-box for a pneumatic-tube system, adapted for communication with the receiving end of a despatch-tube, a receiving-mouth at the lower end of said box and terminating in tapered guides which extend into the box, and valves pivoted in said box to swing toward and from each other, and adapted to seat on the inclined margins of said guides and to close together above said guides.

26. A despatch-box for a pneumatic-despatch-tube system, adapted for connection with the receiving end of a despatch-tube and provided on opposite sides thereof with air-chambers, valves pivoted in said box to swing toward and from each other and occupying said chambers when in their open positions, a receiving-mouth at the lower end of said box and terminating in tapered guides which extend into the box and on the inclined margins of which guides said valves fit, said valves closing together above said guides, and means acting to close said valves.

27. A despatch-box for a pneumatic-despatch-tube system adapted to be connected with the receiving end of the tube and provided on opposite sides thereof with air-chambers, pivoted valves in said box adapted to swing toward and from each other and occupying said chambers when in their outward positions a receiving-mouth at the lower end of said box, which terminates in tapered guides, and on the inclined margins of which said valves fit, said valves closing together above said guides, and springs interposed between said valves and the side walls of the chambers for closing said valves.

28. A despatch-box for a pneumatic-despatch-tube system adapted for attachment to the end of a despatch-tube, said box being provided on opposite sides with air-chambers having upper curved walls, pivoted valves in said chambers which move toward and from each other, said valves being provided at their end margins adjacent to the curved walls of the chambers with curved wings between which and the curved walls of the chambers are formed air-tight joints, and a downwardly-opening receiving-mouth provided with tapered guides which extend into the box and against the inclined margins of which said valves fit, said valves closing together above said guides.

29. A despatch-box for a pneumatic-despatch-tube system adapted to fit over the end of a despatch-tube and provided on its opposite sides with air-chambers, pivoted valves which swing toward and from each other in said chambers, a receiving-mouth at the lower end of the box and provided with tapered guides extending upwardly into the box, said valves being adapted to seat against the inclined margins of said guides and to close together above the guides, curved wings extending rearwardly from said valves and adapted for engagement with projections on the inner faces of the top walls of the casing, and a spring interposed between the valves and the adjacent walls of the chambers to close said valves.

30. A terminal for a pneumatic-despatching-tube system, comprising an upper terminal-box connected with the end of said tube, a lower terminal-box connected by a tube with the upper terminal-box, said boxes being provided with valves, the upper valve being normally open and the lower valve closed, means for closing the upper valve after the cartridge has passed into the terminal and constructed to permit the passage of air at atmospheric pressure behind the cartridge in said tube, said lower valve being opened by the weight of the cartridge to permit the latter to be ejected from the terminal.

31. A terminal for pneumatic-despatch-tube systems, comprising upper and lower terminal-boxes connected by a tube, valves in said upper and lower boxes, springs applied to hold the upper valves normally open, the lower valves being normally closed by the influence of the vacuum in the system, means for admitting air behind the upper valves after a cartridge has passed therebetween to close said valves, means for admitting air to the tube behind the cartridge, and means for cutting off the air in rear of the upper valves at the time the cartridge is discharged from the terminal, said upper valves being constructed to permit the air contained in the tube to leak into the despatch-tube.

32. A terminal for pneumatic-despatch-tube systems, comprising upper and lower boxes, valves in said boxes, springs applied to hold the upper valves normally open, the lower valves being normally closed, means operated by the passage of the cartridge through the terminal-tube to admit air in rear of the upper valves to close the same, and means operated by the passage of the cartridge between the lower valves for cutting off the air from the rear of the upper valves.

In testimony that I claim the foregoing as my invention I affix my signature, in presence of two witnesses, this 15th day of August, A. D. 1902.

WILLIAM H. DINSPEL.

Witnesses for Dinspel:
C. A. NEALE,
T. R. SHEPPARD.

In testimony that I claim the foregoing as my invention I affix my signature, in presence of two witnesses, this 13th day of August, A. D. 1902.

JOSEPH J. STOETZEL.

Witnesses for Stoetzel:
WILLIAM L. HALL,
GEORGE R. WILKINS.